United States Patent [19]
Copperwheat

[11] Patent Number: 6,008,149
[45] Date of Patent: Dec. 28, 1999

[54] MOLDABLE COMPOSITE ARTICLE AND METHOD OF MANUFACTURE

[75] Inventor: Stephen D. Copperwheat, Rome, N.Y.

[73] Assignee: Knowlton Nonwovens, Inc., Utica, N.Y.

[21] Appl. No.: 09/286,916

[22] Filed: Apr. 6, 1999

Related U.S. Application Data

[63] Continuation-in-part of application No. 08/839,016, Apr. 23, 1997, abandoned.

[51] Int. Cl.$^6$ ........................................................ B32B 7/02
[52] U.S. Cl. .......................... 442/381; 442/388; 442/392
[58] Field of Search ................................... 442/328, 381, 442/392, 388

[56] References Cited

U.S. PATENT DOCUMENTS

| | | |
|---|---|---|
| 4,197,343 | 4/1980 | Forsythe . |
| 4,350,732 | 9/1982 | Goodwin . |
| 4,568,581 | 2/1986 | Peoples, Jr. . |
| 4,581,272 | 4/1986 | Walters et al. . |
| 4,673,615 | 6/1987 | Murphy et al. . |
| 4,765,671 | 8/1988 | Allen . |
| 4,780,359 | 10/1988 | Trask et al. . |
| 4,840,832 | 6/1989 | Weinle et al. . |
| 4,851,283 | 7/1989 | Holtrop et al. . |
| 4,888,234 | 12/1989 | Smith et al. . |
| 4,946,738 | 8/1990 | Chenoweth et al. . |
| 5,049,439 | 9/1991 | Robinson . |
| 5,077,874 | 1/1992 | Trask et al. . |
| 5,093,967 | 3/1992 | Frank . |
| 5,098,624 | 3/1992 | Smith et al. . |
| 5,132,166 | 7/1992 | Adams et al. . |
| 5,149,582 | 9/1992 | LaMarca, II et al. . |
| 5,199,141 | 4/1993 | Trask et al. . |
| 5,298,319 | 3/1994 | Donahue et al. . |
| 5,456,976 | 10/1995 | LaMarca, II et al. . |
| 5,492,580 | 2/1996 | Frank . |
| 5,532,050 | 7/1996 | Brooks . |

*Primary Examiner*—Elizabeth M. Cole
*Attorney, Agent, or Firm*—Wall Marjama Bilinski & Burr

[57] ABSTRACT

An article which includes a layer of formable fabric of the type which when subjected to molding under heat and/or pressure possesses a high degree of stiffness. A layer of variable compression fabric capable of assuming variable thickness when subjected to molding under heat and/or pressure being bonded to the surface of the variable compression fabric, with said layers are made of the same thermoformable polymeric chemical substance.

20 Claims, 2 Drawing Sheets

MOLDABLE COMPOSITE ARTICLE AND METHOD OF MANUFACTURE

CROSS REFERENCE TO RELATED APPLICATION

This is a Continuation-in-Part application of U.S. Ser. No. 08/839,016, filed Apr. 23, 1997, now abandoned the entirety of which is incorporated herein by reference.

BACKGROUND OF THE INVENTION

The present invention relates in general to a composite article and more specifically to a moldable nonwoven fibrous composite article.

In the fabrication of articles containing polymeric materials which possess sufficient strength and stiffness to function as automobile trunk liners, it is known to take sheets of thermoformable material having different properties, dispose them as layers, and then compress them together under heat and pressure in a mold. At least one layer is used which imparts strength and stiffness and another layer produces bulk sufficient for molding. U.S. Pat. No. 5,298,319 discloses automobile trunk liners fabricated from a fibrous composite having outer layers composed of non-woven fabric consisting essentially of polypropylene staple fiber and an intermediate layer composed of extruded polypropylene. Such prior art fibrous composites are assembled simultaneously with the extrusion of the intermediate polypropylene layer. The inner surfaces of the two outer non-woven fabric layers adhere to the surfaces of extruded polypropylene by the heat generated in the extrusion process and the consequent molten state of adjacent surfaces that melt during the process. With all three layers containing the same polymer, namely polypropylene, eventual recycling of the articles is facilitated.

Several shortcomings are inherent in this prior art procedure. Because the intermediate layer imparting bulk necessary for molding is extruded, articles molded therefrom will necessarily be of uniform thickness. Another shortcoming is that the fibrous composite must be assembled simultaneously with extrusion of the intermediate layer.

SUMMARY OF THE INVENTION

It is therefore an object of the present invention to provide an improved moldable fibrous composite that can be used to fabricate molded articles of variable thickness and density.

It is another object of the present invention to provide an improved moldable fibrous composite made of layers which can be assembled successively.

It is another object of the present invention to provide an improved moldable fibrous composite made from compatible materials which can be readily recycled.

It is yet another object of the present invention to provide a non-woven fibrous composite that can be molded in a one-step molding process.

It is yet another object of the present invention to provide a non-woven fibrous composite that can be used to mold articles possessing a high thickness to weight ratio.

It is still a further object of the present invention to provide an improved moldable fibrous composite that, when subjected to molding under heat and pressure, will readily assume the shape of the mold without breaking or tearing.

It is yet a further object of the present invention to provide an improved moldable fibrous composite that can be used to thermoform articles without the need of injected resins.

To achieve the aforementioned and other objects and overcome the problems of the prior art described above, the present invention as embodied and broadly described herein provides for a moldable non-woven fibrous composite material and method of manufacture. The non-woven fibrous composite in accordance with the present invention possesses at least two functional layers, all of which are made of the same non-woven thermoformable polymeric chemical substance or material. Suitable polymeric materials include polypropylene, polyvinyl chloride, polyvinyl acetate, polyamide, polyvinyl alcohol, polyethylene, polyurethane and polyester. In a preferred embodiment, the layers are made of a polyester. These composites may typically be used for but not limited to the manufacture of automobile headliners, trunk liners, passenger compartment components, luggage, furniture, sporting goods, and filtration products.

The polymeric chemical substance selected is fabricated into two different fabrics having different mechanical and/or other physical properties. At least one fabric is a formable fabric, which upon final molding under heat and/or pressure, possesses a relatively high degree of strength and stiffness. The other fabric is a variable compression fabric (also described as a variable thickness fabric) which is capable of assuming variable thickness and density when subjected to molding under heat and/or pressure. In certain applications where the final article requires a uniform thickness and density, the variable compression fabric may also be used. Such a variable compression fabric is the subject of U.S. Pat. No. 5,532,050 which is incorporated herein by reference. In an alternative embodiment, another layer constituting a facing fabric can be applied to the outer surface of either of the layers for the purpose of enhancing the appearance of articles molded from the composite. The functional layers and the layer of facing fabric may be assembled into a composite capable of shipment to fabricators of finished, formable articles. The composite may be assembled by stacking the layers one upon the other and combining them together. The term "composite", as used herein includes any stack of successive layers whether or not cohesion between or among such layers has been enhanced by chemical and/or physical means. Cohesion of adjacent layers of the composite can be enhanced by such techniques as spray powder bonding, use of liquid dispersion/solutions, stitch bonding, flame lamination, use of an intermediate adhesive fabric between functional layers, and mechanical needlepunching, all of which are well known to those versed in the art.

Also included in this concept is a further embodiment in which blends of selected fibers having predetermined melting temperature ranges are contained within either or both layers which effects the adhesion between the layers of the composite and stiffness of the final molded article. This mechanism of adhesion which takes place can be described as a "thermoplastic bonding" and is more fully described in U.S. Pat. No. 5,456,976; col. 3, lines 36–50 which is incorporated herein by reference. A sheet of the composite is then set into a mold, formed with heat and/or pressure to take the shape of the mold cavity, and thereby forming the final article shape.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

The present invention will now be described in detail by reference to specific embodiments and the drawings.

Figure 2:
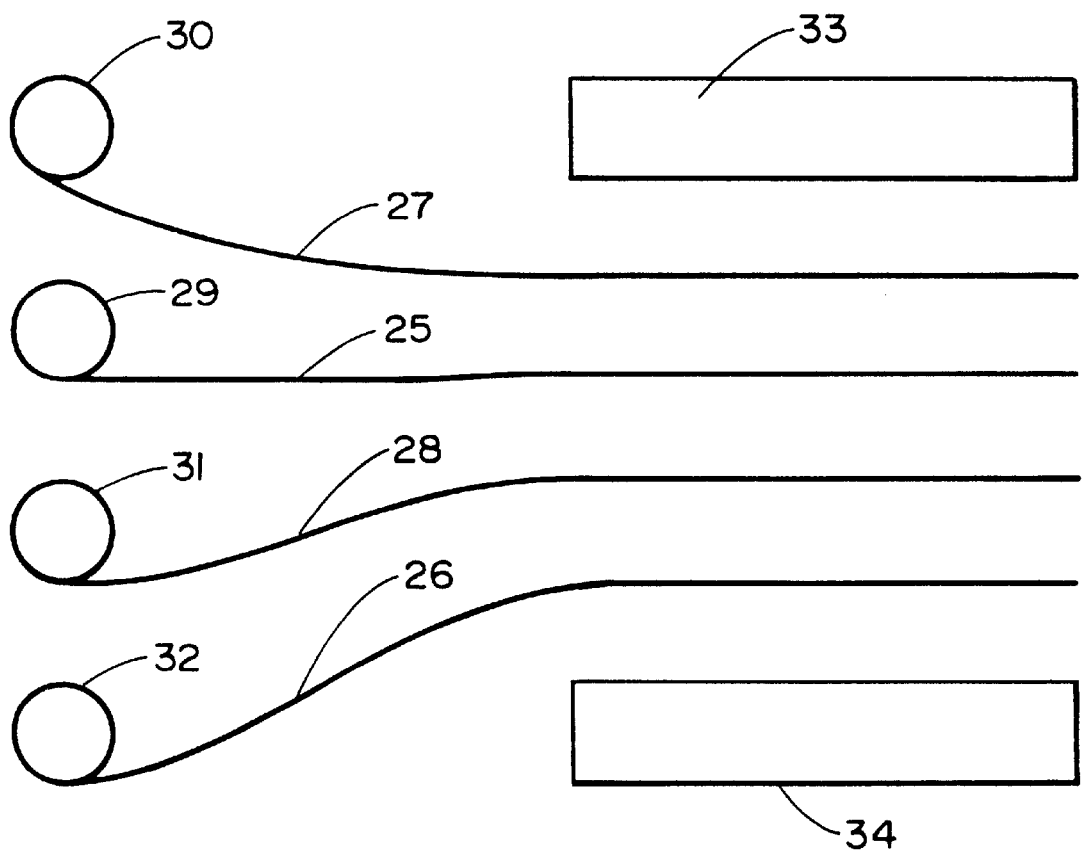
FIG. 2 is a schematic representation of a system for producing molded articles according to another embodiment of the present invention.

In accordance with the present invention, articles are molded from separate rolls or sheets of variable compression and formable fabric layers, respectively. As illustrated in FIG. 2, formable fabric (25 and 26) is dispensed from rolls (29 and 32, respectively), variable compression fabric (28) is dispensed from roll (31) and, optionally, facing fabric (27) from roll (30). These fabric layers are simultaneously fed from their respective rolls in a molding means having top (33) and bottom (34) portions, as depicted in FIG. 2.

Automobile headliners are formed by passing the separate layers of variable compression and formable fabric, which contain binder fibers, through a compression mold having a cavity whose shape is the form of the headliner as a roll of the composite material is unrolled. To effect molding, the composite material is subjected to an elevated temperature for a predetermined time and then cooled in the mold. The binder fibers in the separate layers soften and/or melt and intermingle under heat and/or pressure and upon mold release the fibers will cool and harden and bond the layers together.

In accordance with another embodiment, layers of formable and variable compression fabric and, optionally a layer of facing fabric, are formed into a composite prior to fabrication in an article.

Figure 1:
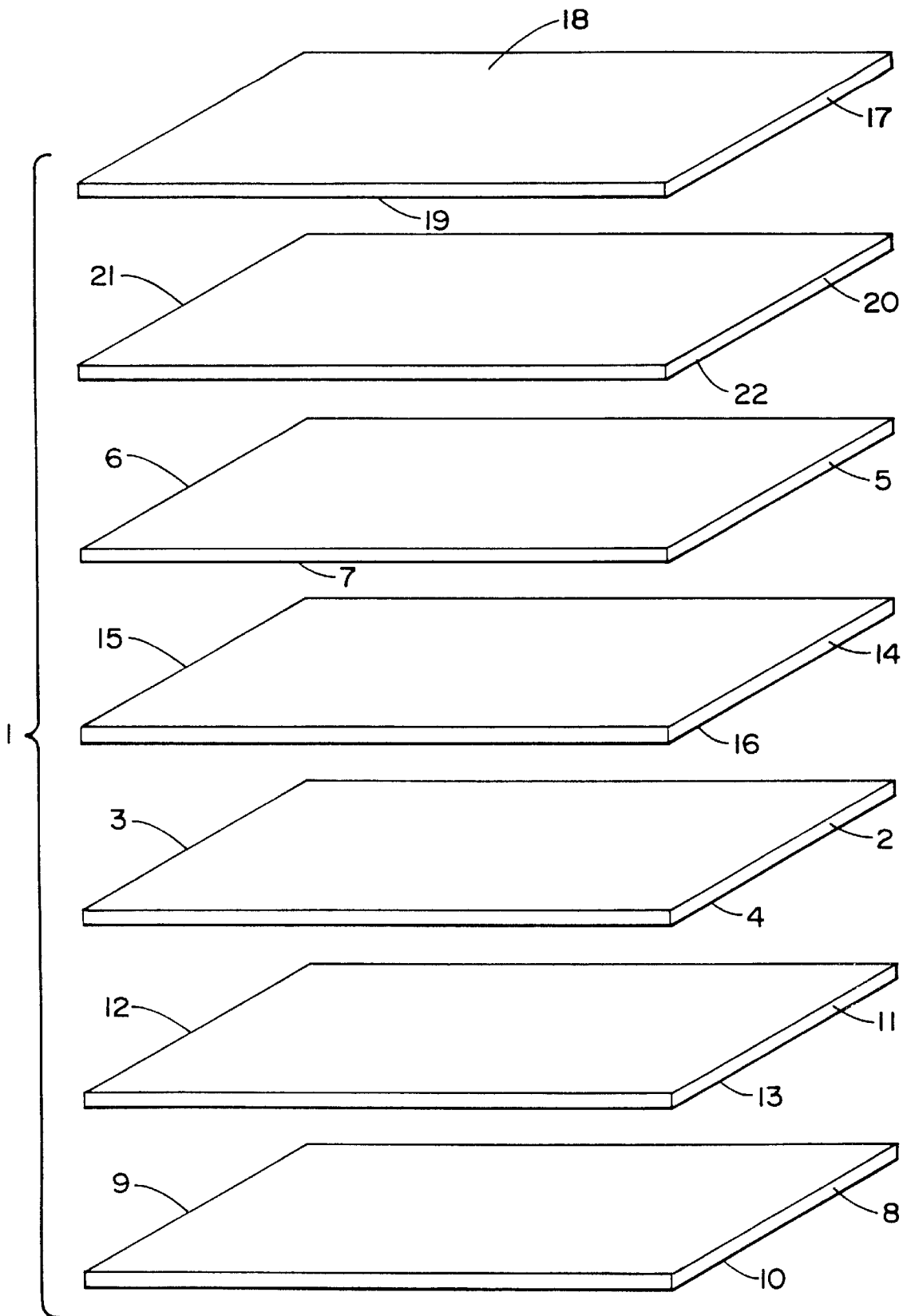
FIG. 1 is an isometric view of the moldable fibrous composite according to an embodiment of the present invention showing its layered configuration.

Reference is made to FIG. 1 which illustrates the various layers which comprise a composite article according to the present invention. For ease of illustration, the thicknesses of the various layers have not been drawn to scale.

In FIG. 1, a composite article (1) comprising a layer of variable compression fabric (2) is sandwiched between formable fabric layer (5), having upper surface (6) and lower surface (7), and formable fabric layer (8), having upper surface (9) and lower surface (10), upper (14) and lower (11) adhesive layers are interposed between variable compression fabric layer (2) and formable fabric layers (5) and (8), respectively, such that the upper surface (3) of variable compression layer (2) abuts the lower surface (16) of adhesive layer (14) and the upper surface (15) of adhesive layer (14) abuts the lower surface (7) of formable fabric layer (5) and the upper surface (12) of adhesive layer (11) abuts the lower surface (4) of variable compression layer (2) and the lower surface (13) of adhesive layer (11) abuts the upper surface (9) of formable fabric layer (8), thereby enhancing contact and cohesion between formable fabric layers (5) and (8) and variable compression layer (2).

The foregoing embodiment may be modified by applying the lower surface (19) of facing fabric layer (17) to the upper surface (6) of formable fabric layer (5) by means of adhesive layer (20) such that the lower surface (19) of facing fabric (17) abuts the upper surface (21) of adhesive layer (20) and the lower surface (22) of adhesive layer (20) abuts the upper surface (6) of formable fabric layer (5), thereby enhancing the appearance of the outer surface of the composite material and of articles molded therefrom. Automobile headliners or trunk liners can then be formed by passing the composite material through compression molding means, subjecting the composite material to elevated temperature and/or pressure for a time sufficient to have the composite material assume the shape of the mold's cavity.

For use in the present invention; it has been found that the basis weight for the formable or stiffening fabric should be from about 4 to 18 oz/yd$^2$. A preferred range is from about 6 to 12 oz/yd$^2$. These ranges provide for an optimum combination of handleability in manufacturing, controlling stiffness properties in the final molded articles, and economy in the manufacturing of the final product.

In another embodiment of the invention, a sheet of polyester variable compression fabric is sandwiched between two sheets of formable polyester in the form of a needlepunch felt, thereby forming a composite article. The needlepunch felt is produced by Knowlton Nonwovens, Inc. of Utica, N.Y. Cohesion between adjacent sheets is enhanced by mechanical needlepunching. The composite material is then rolled into storage rolls. A layer of decorative fabric, such as HOF AHMV8 printed stitchbond polyester or Foss needlepunch polyester, may be applied to an outer surface of one of the layers of the formable polyester fabric.

An article, such as an automobile trunk liner or head liner, is formed in the mold under heat and/or pressure. The molded article is then cooled to ambient temperature. U.S. Pat. No. 5,298,319, referred to above, teaches the basic molding procedures and apparatus for making articles of the type contemplated by the present invention and is incorporated herein by reference.

It will be understood that different means of enhancing cohesion may be employed between different fabric layers of the same composite material. For example, enhanced cohesion between the facing fabric layer and a formable fabric layer may be effected by the interposition there between of an adhesive layer, while enhanced cohesion between a formable fabric layer and the variable thickness fabric layer may be effected by needlepunching.

Alternatively, the composite material suitable for molding may be fabricated from a single layer of formable fabric and a layer of variable compression fabric. A facing fabric layer may be applied to the outer surface of either the formable fabric layer or the variable compression fabric layer. Cohesion between functional fabric layers may be enhanced by such mechanical means as needlepunching and/or by adhesive means such as spray power bonding, the use of liquid dispersion/solutions, flame lamination, and/or the interposition of an adhesive layer and combinations thereof.

The following examples illustrate various structural embodiments of the present invention and how the physical properties of structures of the present invention are controlled by varying certain process parameters. In the example below the first and second stiffener layers are produced by the needlepunch process by first blending the selected fibers on standard textile blending equipment following by carding the fibers into a nonwoven web which is then cross-lapped to build a high loft multilayered batt which is subsequently needlepunched with about 1,000 pin needle penetrations.

EXAMPLE

A moldable composite structure in which a layer of variable compression fabric is sandwiched between two layers or sheets of a formable (stiffener) fabric is made by the following technique.

The layers of the three materials are as follows:

| First Stiffener Layer | 50% Fiber Innovation Technologies 3.5 denier × 2 inch crystalline polyester bicomponent binder fiber 50% Kosa 15 denier × 3 inch Type 295 polyester basis weight - 6 oz/yd² needlepunch construction (stiffener fabric) |
|---|---|
| Second Stiffener Layer | same fibers, blend, and construction as above basis weight - 9 oz/yd² |
| Variable Compression Layer | 50% Fiber Innovation Technologies 3.5 denier × 2 inch crystalline polyester bicomponent binder fiber 25% 6.7 dtex polyester 25% 17.0 dtex polyester basis weight - 20 oz/yd² thickness - 20 mm vertical lap construction (variable compression fabric) |

There is no adhesive layer between each of these materials. The vertical lap product variable compression fabric is produced on a Strudo machine produced by:

I.N.T., s.r.o. 460 05 Liberec, Karla Capka 302/22 Czech Republic

To produce the variable compression layer, the three polyester fibers, including the one binder fiber, are blended together on standard textile fiber blending equipment and carded into a nonwoven web. The carded web is fed to the vertical lap Strudo machine to be folded back onto itself or pleated to produce a vertically folded product of given thickness. The thick product is passed through an oven which heats the product to at least about 150° C. which softens or melts the binder fiber to allow it to thermally bond to the other fibers in the blend, thereby producing a lofty, thick 3-dimensional product.

To produce the molded article defined above, the process includes layering the fabrics into a composite, preheating the composite to about 400° F. for about 8 minutes, placing the composite into the mold, closing the mold to a 16 mm gap for about 4 minutes, and opening and removing the molded article. For the warm mold samples, the mold (warm tool) was preheated to about 300° F.

Composite three layered samples are in which the variable compression layer is sandwiched between the first and second stiffener layers made in both the machine and cross-machine direction. Additional samples having the same are made in both the machine and the cross-machine direction using an unheated mold (cool tool) at ambient temperature. Four samples made according to the above method were tested under the Standard Test Methods For Flexural Properties of Unreinforced and Reinforced Plastics and Electrical Insulating Materials using Test Method I-A three-point loading system utilizing center loading on a simply supported beam, ASTM Designation D790-92.

The test results are tabulated in Table 1 below:

TABLE 1

FLEX TEST RESULTS

| SAMPLE* DESCRIPTION | Thickness (mm) | OFFSET YIELD LOAD (N) | YIELD LOAD AT 1" (N) | (%) | SLOPE (N/mm) |
|---|---|---|---|---|---|
| cool tool SSL VCL FSL (machine direction) | 16.50 | 20.9 | 21.2 | 101 | 5.72 |
| warm tool | 17.50 | 21.5 | 22.5 | 105 | — |
| VCL FSL (machine direction) cool tool SSL VCL FSL (crossmachine dir) | 17.50 | 24.5 | 29 | 118 | 6.46 |
| warm tool SSL VCL FSL (crossmachine dir) | 17.75 | 22.4 | 28.5 | 127 | 5.90 |

*SSL = Second Stiffener Layer
VCL = Variable Compression Layer
FSL = First Stiffener Layer The operative range which provides for a suitable stiffness for the molded composite of the present invention is about 13 to 26 Newtons for the Offset Yield Load. The Yield Load at 1" for the present invention ranges from about 90 to 140%, and the Slope should be in the range of about 2.5 to 7.0 N/mm.

The product of the present invention in a preferred embodiment, requires a high degree of stiffness to be suitable for use as an automotive headliner, with the term "high degree of stiffness" being defined by the flex test results disclosed in Table 1 and discussed above. A molded headliner requires a high degree of stiffness in order to support its own weight over its span, which can be up to 8 feet in a minivan, and the additional weight of the interior dome lights and sun visors, without bending and cracking over a broad range of temperatures from −40° to 185° F. when exposed for up to three days as evaluated in a standard environmental resistance test for headliners. The product must not flex or bend to a failure point where it will crack the headliner, making it unable to bear the weight of the added headliner components. Also, a failure crack in the headliner will show through the decorative fabric layer in the headliner, giving it an aesthetically unacceptable appearance for installation into an automobile. When stressed beyond its limit, the product of the present invention will bend and then crack upon failure, making it unsuitable for use as an automotive headliner for the reasons stated. "Low modulus" products do not crack upon failure, and do not exhibit the stiffness required to bear the added component weight while in use, particularly in the environmental resistance test described above. Therefore, low modulus products are inherently unsuitable for use as automobile headliner.

Although various embodiments of the present invention have been described herein, these are for the purpose of explaining and illustrating the invention, and should not be understood as limiting the scope of the invention. Various modifications, which will be apparent to one skilled in the art, are within the scope of the present invention and are embraced in the claims which follow.

While the present invention has been particularly shown and described with reference to the preferred mode as illustrated in the drawing, it will be understood by one skilled in the art that various changes in detail may be effected therein without departing from the spirit and scope of the invention as defined by the claims.

What we claim is:

1. An article suitable for use in molding into automobile headliners, comprising a layer of formable nonwoven fabric which when subjected to molding under heat and/or pressure possesses a high degree of stiffness, such that said formable nonwoven fabric has an offset yield load of about 13 to 26 Newtons, a yield load at one inch of from about 90 to 140%, and a slope in the range of about 2.5 to 7.0 N/mm all under ASTM D-790-92 Test Method I, said layer of formable fabric having an upper and lower surface, and a layer of variable compression nonwoven fabric capable of assuming variable thickness when subjected to molding under heat and/or pressure, said variable compression fabric having an upper and lower surface, said lower surface of formable fabric being bonded to said upper surface of variable compression fabric, and wherein said layers are made of the same thermoformable polymeric chemical substance.

2. An article as claimed in claim 1 wherein the said formable fabric and the said variable compression fabric both consist essentially of a polyester.

3. An article as claimed in claim 2 wherein bonding between the said layer of formable fabric and the said layer of variable compression fabric is enhanced by mechanical means.

4. An article as claimed in claim 3 wherein the mechanical means of enhancing cohesion between layers is needlepunching.

5. An article as claimed in claim 2 wherein bonding between the said layer of formable fabric and the said layer of variable compression fabric is enhanced by adhesive means.

6. An article as claimed in claim 2 wherein a layer of facing fabric having an upper and a lower surface is applied to the layer of formable fabric so that the lower surface of the facing fabric is adjacent to the upper surface of the formable fabric.

7. An article as claimed in claim 2 wherein a layer of facing fabric having an upper and a lower surface is applied to the layer of variable compression fabric so that the lower surface of the facing fabric is adjacent to the lower surface of the variable compression fabric.

8. An article suitable for use in molding into automobile headliners, comprising a layer of variable compression nonwoven fabric capable of assuming variable thickness when subjected to molding under heat and/or pressure and two layers of formable nonwoven fabric which when subjected to molding under heat and/or pressure possesses a high degree of stiffness such that said formable nonwoven fabric layers have an offset yield load of about 13 to 26 Newtons, a yield load at one inch of from about 90 to 140%, and a slope in the range of about 2.5 to 7.0 N/mm all under ASTM D790-92 Test Method I, said layers of formable fabric each having an upper and lower surface, said layer of variable compression fabric being sandwiched between the upper surface of one layer of formable fabric and the lower surface of the other layer of formable fabric and wherein layers are made of the same thermoformable polymeric chemical substance.

9. An article as claimed in claim 8 wherein the said formable fabric and the said variable compression fabric both consist essentially of a polyester.

10. An article as claimed in claim 9 wherein bonding between said layers of formable fabric and variable compression fabric is enhanced by mechanical means.

11. An article as claimed in claim 9 wherein bonding between said layers of formable fabric and variable compression fabric is enhanced by adhesive means.

12. An article as claimed in claim 9 wherein a layer of facing fabric having an upper and a lower surface is applied to a layer of formable fabric such that the upper surface of a layer of formable fabric is adjacent to the lower surface of the layer of facing fabric.

13. An article as claimed in claim 8 wherein a layer of facing fabric having an upper and a lower surface is applied to a layer of variable compression fabric such that the upper surface of a layer of variable compression fabric is adjacent to the lower surface of the layer of facing fabric.

14. An article suitable for use in molding into automobile headliners, comprising two layers of variable compression nonwoven fabric capable of assuming variable thickness when subjected to molding under heat and/or pressure and a layer of formable nonwoven fabric which when subjected to molding under heat and/or pressure possesses a high degree of stiffness such that said formable nonwoven fabric layer has an offset yield load of about 13 to 26 Newtons, a yield load at one inch of from about 90 to 140%, and a slope in the range of about 2.5 to 7.0 N/mm all under ASTM D790-92 Test Method I, said layers of variable compression fabric each having an upper and a lower surface, said layer of formable fabric being sandwiched between the upper and surface of one layer of variable compression fabric and the lower surface of the other layer of variable compression fabric, wherein said layers are made of the same thermoformable polymeric chemical substance.

15. An article of variable thickness in the form of a non-woven fibrous composite suitable for use as an automobile headliner, said fibrous composite comprising a plurality of layers including a layer of formable nonwoven fabric which when subjected to molding under heat and/or pressure imparts a high degree of stiffness such that said formable nonwoven fabric layer has an offset yield load of about 13 to 26 Newtons, a yield load at one inch of from about 90 to 140%, and a slope in the range of about 2.5 to 7.0 N/mm all under ASTM D790-92 Test Method I to said article, and a layer of variable compression nonwoven fabric capable of assuming variable thickness, and wherein said layers are made of the same thermoformable polymeric chemical substance.

16. An article of variable thickness as claimed in claim 15 wherein the layer of variable thickness fabric is sandwiched between two layers of formable fabric.

17. An article of variable thickness as claimed in claim 15 wherein the layer of formable fabric is sandwiched between two layers of variable compression fabric.

18. An article as claimed in claim 15 wherein the said formable fabric and the said variable compression fabric both consist essentially of a polyester.

19. An article as claimed in claim 15 which is in the shape of an automobile liner.

20. An article as claimed in claim 15 which is in the shape of an automobile headliner.

* * * * *

UNITED STATES PATENT AND TRADEMARK OFFICE
CERTIFICATE OF CORRECTION

PATENT NO. : 6,008,149
DATED : December 28, 1999
INVENTOR(S) : Cooperwheat

It is certified that error appears in the above—identified patent and that said Letters Patent is hereby corrected as shown below:

CLAIMS

Claim 19, Column 8, Line 58, after the word automobile please insert the word --trunk--.

Signed and Sealed this

Twenty-fourth Day of April, 2001

*Attest:*

NICHOLAS P. GODICI

*Attesting Officer*   *Acting Director of the United States Patent and Trademark Office*